US008007360B2

(12) United States Patent
Kishi

(10) Patent No.: US 8,007,360 B2
(45) Date of Patent: Aug. 30, 2011

(54) GAMING MACHINE

(75) Inventor: Hideaki Kishi, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 812 days.

(21) Appl. No.: 12/018,475

(22) Filed: Jan. 23, 2008

(65) Prior Publication Data

US 2008/0214277 A1 Sep. 4, 2008

(30) Foreign Application Priority Data

Jan. 24, 2007 (JP) ................................. 2007-013780

(51) Int. Cl.
*A63F 13/00* (2006.01)

(52) U.S. Cl. .......... 463/20; 362/623; 362/624; 362/625; 362/626

(58) Field of Classification Search .................... 463/20; 349/64, 66, 67; 362/623–626
See application file for complete search history.

(56) References Cited

U.S. PATENT DOCUMENTS

| | | | | |
|---|---|---|---|---|
| 7,001,060 | B1 * | 2/2006 | Kimura | 362/620 |
| 7,800,721 | B2 * | 9/2010 | Shutou et al. | 349/118 |
| 2005/0272500 | A1 | 12/2005 | Tanimura et al. | |
| 2005/0282617 | A1 * | 12/2005 | Sekiguchi et al. | 463/20 |

FOREIGN PATENT DOCUMENTS

| | | |
|---|---|---|
| JP | 2005-342344 | 12/2005 |

OTHER PUBLICATIONS

U.S. Appl. No. 12/018,423, filed Jan. 23, 2008, Kishi.

* cited by examiner

*Primary Examiner* — Dmitry Suhol
*Assistant Examiner* — Malina K Rustemeyer
(74) *Attorney, Agent, or Firm* — Oblon, Spivak, McClelland, Maier & Neustadt, L.L.P.

(57) ABSTRACT

A gaming machine according to one embodiment of the invention has a rotating reel display device that variably displays a plurality of kinds of identification information required for a game, and a transmissive image display device 30 to enable symbol information of the rotating reel display device to be visually recognized. The transmissive image display device 30 has a liquid crystal panel 34 that displays an image, and a light guide plate 37 that is provided on the back side of the display panel 34 and that irradiates the display panel while having display windows 37L, 37C and 37R formed therein to cause the symbol information of the rotating reel display device to be visually recognized, and prism sheets 40, each of which deflects the introduced light introduced to inside the light guide plate 37 toward the vertex area of the rotating reel, are provided in frame portions 37L, 37C and 37R of the display windows.

7 Claims, 8 Drawing Sheets

GAMING MACHINE

The present disclosure relates to subject matter contained in Japanese Patent Application No. 2007-013780 filed on Jan. 24, 2007, which is expressly incorporated herein by reference in its entireties.

BACKGROUND OF THE INVENTION

The present invention relates to a gaming machine such as, for example, a slot machine, pinball machine and the like provided with an image display device capable of displaying various kinds of game information.

Conventionally, as the above-mentioned gaming machine, machines have been known into which are incorporated an image display device to be visually recognized to enhance the effect of representation. In the image display device, during a period of time the game is carried out, in order to raise expectations and excitement of players, various characters are displayed to perform a variety of representation (representation image display).

The above-mentioned image display device is installed in some portion of a housing of the gaming machine, and for example, as disclosed in Japanese Laid-Open Patent Publication No. 2005-342344, a gaming machine (slot machine) is known where an image display device is configured to be a transmissive type, and the machine is configured to enable identification information of a variable display device (rotating reel display device), which is installed on the back of the image display device and variably displays a plurality of kinds of identification information, to be superimposed on an image of the image display device to be visually recognized. This slot machine is configured to perform variable display and stop display of a plurality of kinds of identification information (symbols) on conditions that a predetermined amount of BET and operation of a start lever is performed, and to add a predetermined amount of game value based on a combination of symbols stopped and displayed.

However, in the gaming machine provided with the transmissive image display device as described above, rectangular display windows are formed in the diffusing sheet, light guide plate and the like constituting the image display device, corresponding to installation positions of rotating reels. The player is capable of visually recognizing the rotating reels constituting the variable display device from the display windows. Further, fluorescent lamps are installed in the upper and lower positions (upper and lower positions of the display windows) forward of the rotating reels, on the back of the image display device inside the housing of the gaming machine, and irradiate the rotating reels to enable the identification information to be visually recognized easily.

The above-mentioned rotating reels are irradiated by the fluorescent lamps installed above and under the display windows. However, since the surface of each of the rotating reels is circular in cross section and curved, the curved vertex portion (which the player visually recognizes from the display window and which corresponds to on the pay line) is dark, and a problem arises that the identification information on the rotating reels is hard to see.

Accordingly, a gaming machine is required which is a gaming machine that enables the variable display device to be visually recognized through the transmissive image display device and that makes it easier to visually recognize the identification information of the variable display device.

BRIEF SUMMARY OF THE INVENTION

In an aspect of the present invention, there is provided a gaming machine comprising a variable display device that variably displays a plurality of kinds of identification information required for a game and a transmissive image display device that enables the identification information of the variable display device to be visually recognized, wherein the transmissive image display device has a display panel that displays an image, and a light guide plate that is provided on the back side of the display panel and that irradiates the display panel while having a display window formed therein to cause the identification information of the variable display device to be visually recognized, and a deflecting member, which deflects introduced light introduced to inside the light guide plate toward a display portion of the identification information of the variable display device, is provided in a frame portion of the display window.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of a gaming machine according to the invention will specifically be described below with a slot machine exemplified.

Figure 1:
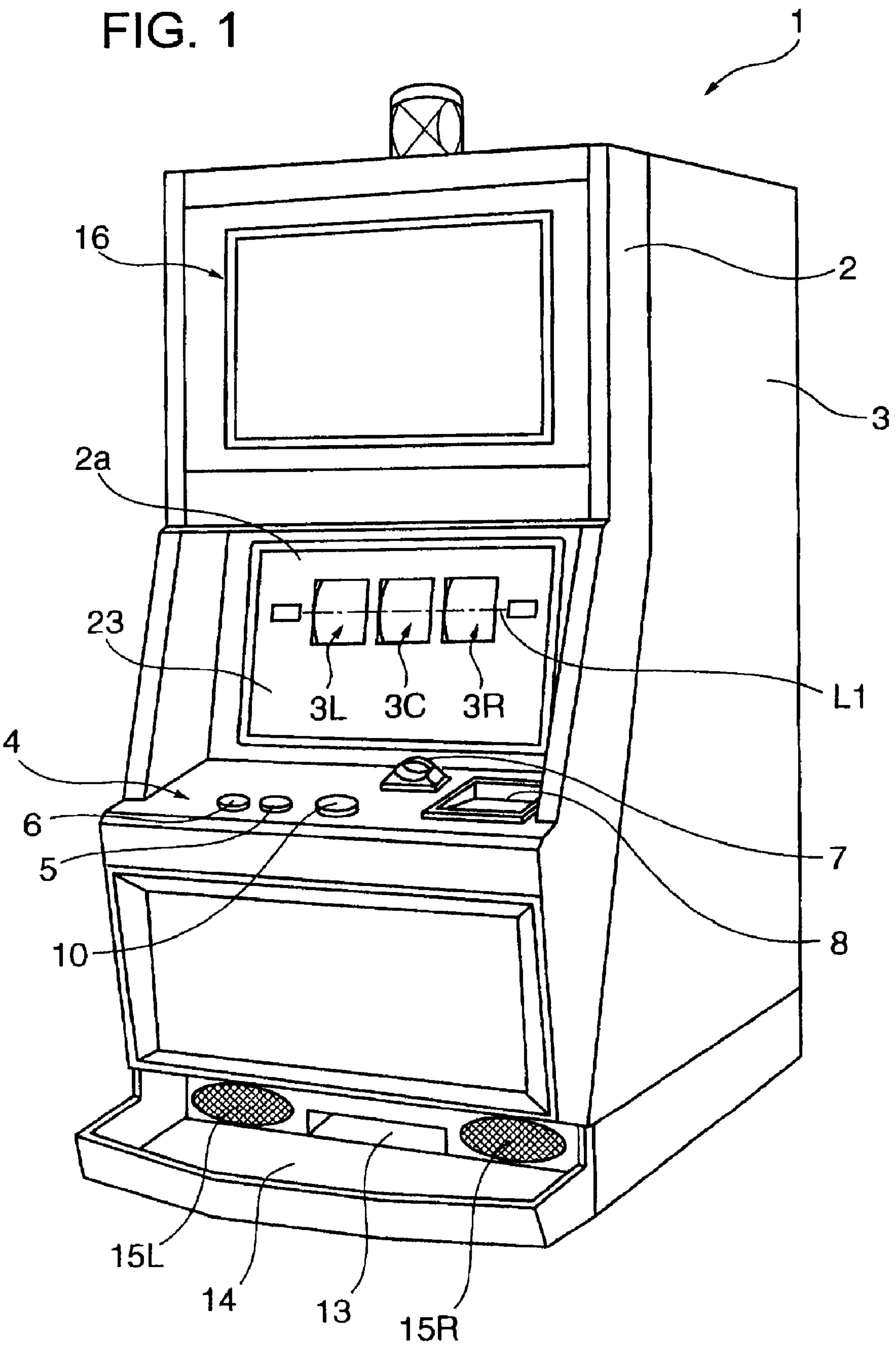
FIG. 1 is a perspective view showing a slot machine that is an example of a gaming machine according to the invention.
Figure 2:
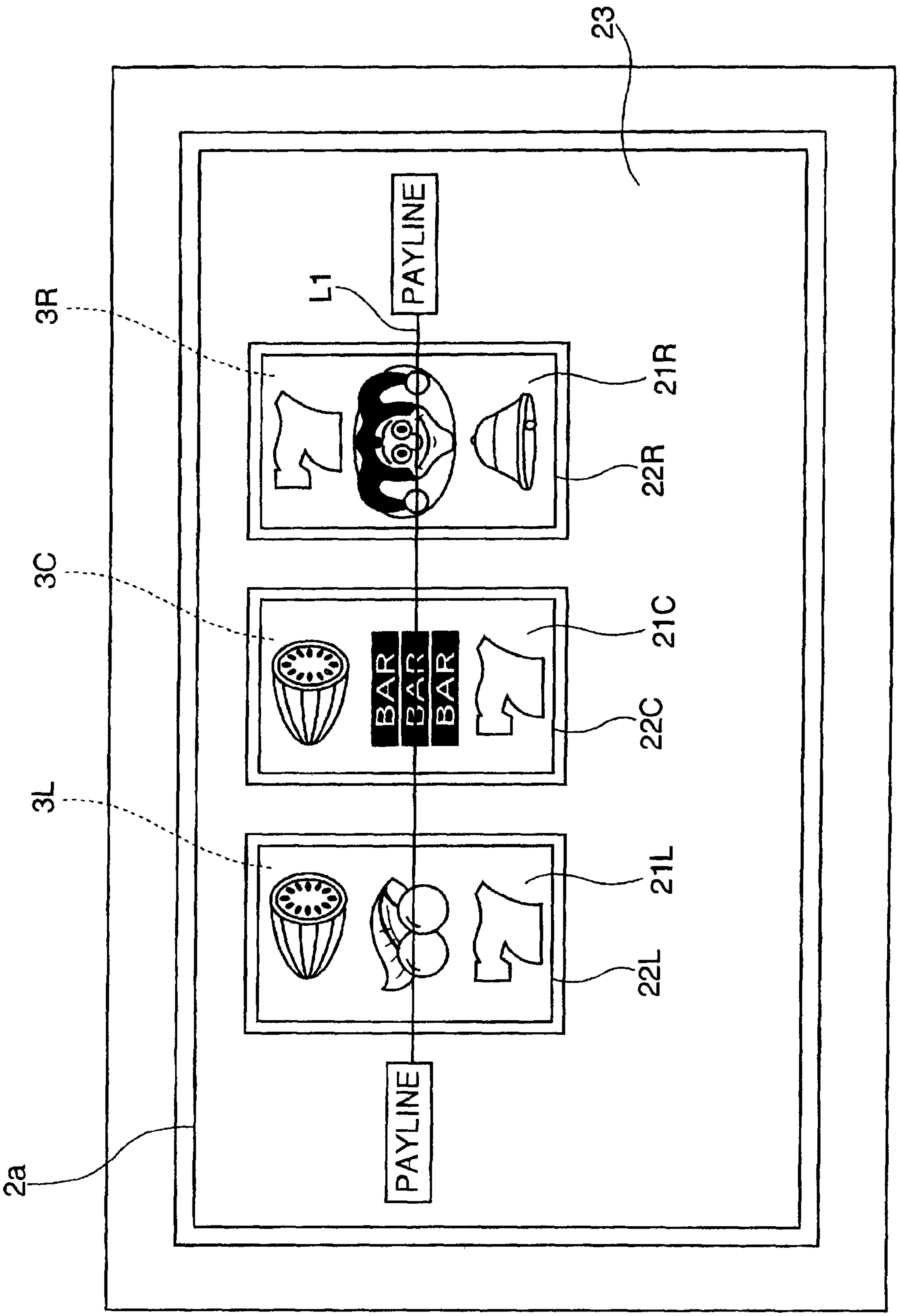
FIG. 2 is a view showing an enlarged game area of the slot machine.
Figure 3:
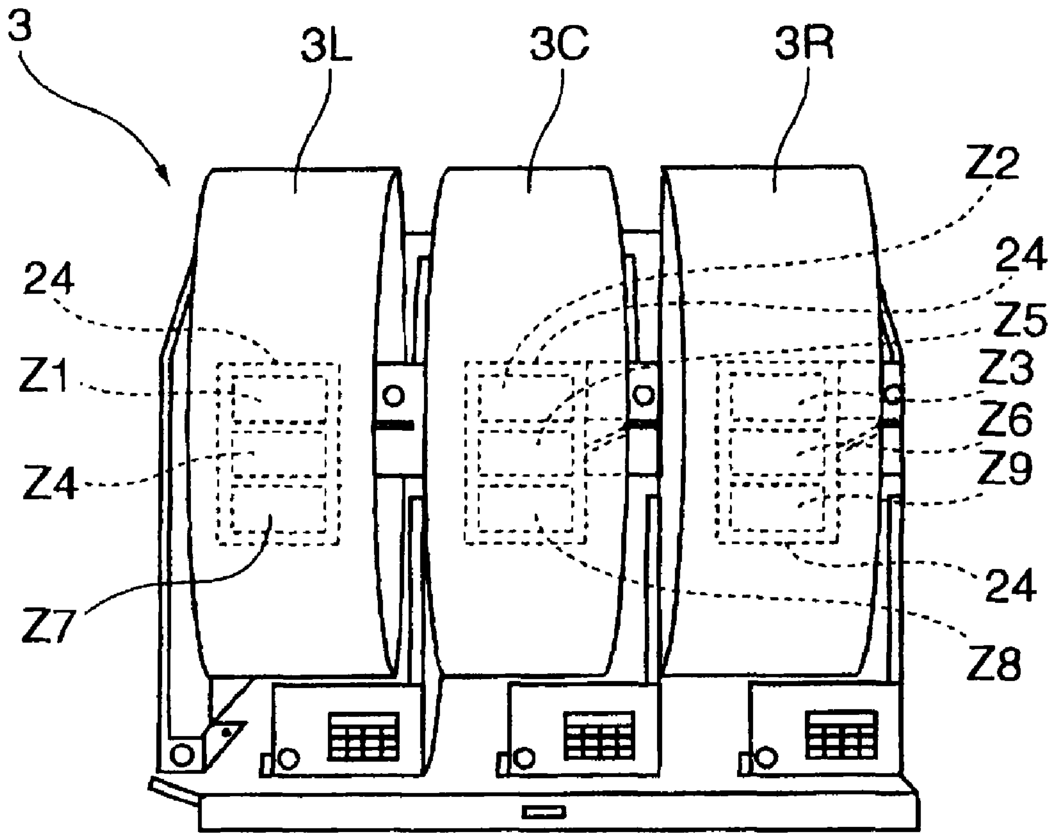
FIG. 3 is a view showing a rotating reel display device showing an example of a variable display device.
Figure 4:
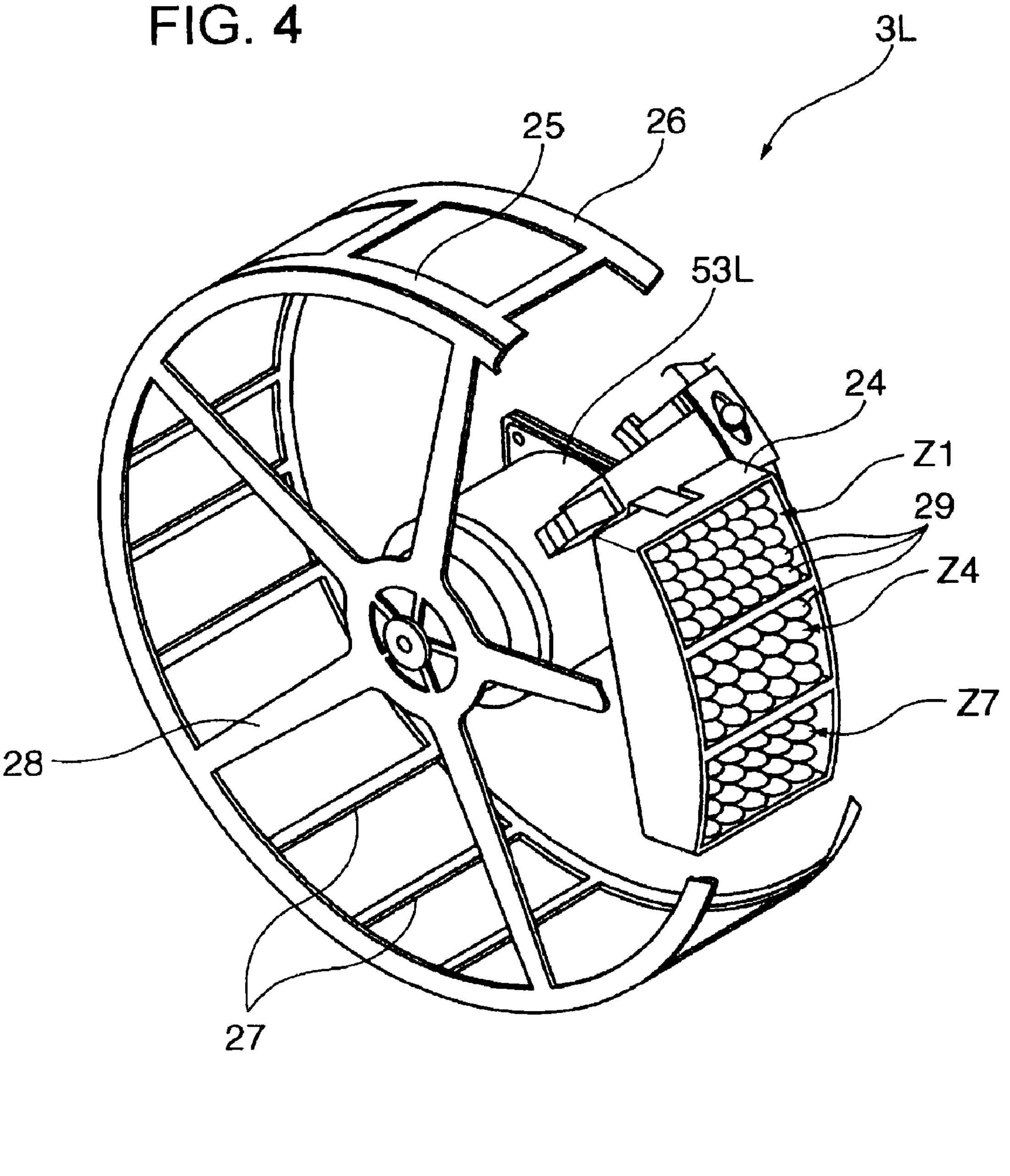
FIG. 4 is a view showing a configuration of the rotating reel as shown in FIG. 3.

FIG. 1 is a perspective view showing a configuration example of the slot machine, FIG. 2 is a view showing an enlarged game area of the slot machine, FIG. 3 is a view showing a rotating reel display device showing an example of a variable display device, and FIG. 4 is a view showing a configuration of the rotating reel as shown in FIG. 3.

The slot machine 1 according to this embodiment is provided with a housing 3 having an openable/closable front door 2 at the front. In the front door 2, a liquid crystal display portion (a liquid crystal display device) 2*a* constituting a transmissive image display device is provided in the portion higher than almost the center at the front. In the inside of the housing 3, a rotating reel display device 3 having three rotating reels 3L, 3C, and 3R constituting the variable display device is provided inside the front door 2 (on the back of the liquid crystal display portion 2*a*). On the circumferential surface of each of the rotating reels, a plurality of kinds of identification information, for example, a symbol line is drawn, and symbols drawn on the rotating reels can respectively be visually recognized through rectangular symbol display areas 21L, 21C and 21R (see FIG. 2) formed in the liquid crystal display portion 2*a*.

A pay line L1 extending horizontally is provided in the symbol display areas 21L, 21C and 21R in relation to the rotating reels 3L, 3C and 3R. In addition, not shown in the symbol, as well as the pay line, other pay lines may be provided in the upper and lower portions, and two pay lines may further be provided obliquely. When a plurality of pay lines is provided, the number of pay lines may be varied corresponding to the amount of game value inserted for the game.

The liquid crystal display portion 2*a* is provided with the symbol display areas 21L, 21C and 21R, window frame display areas 22L, 22C and 22R respectively provided to enclose the areas 21L, 21C and 21R, and representation display area 23. The window frame display areas 22L, 22C and 22R represent frames of display windows of symbols drawn on the rotating reels 3L, 3C and 3R, respectively. Further, the representation display area 23 displays dynamic images such as a representation image to determinably broadcast that establishment of wining a bonus can be achieved, representation image to increase interest in the game, information necessary for the player to develop the game with advantage, representation images for demonstration, and the like.

As a matter of course, the liquid crystal display portion 2*a* may display static images as well as dynamic images. Such static images may be displayed by image control in the liquid crystal display portion, or a configuration may be adopted that a panel on which the static image is drawn is attached.

A base portion 4 with a substantially horizontal surface is formed under the liquid crystal display portion 2*a*. On the left side of the base portion 4 are provided BET switches 5 and 6 to bet a game value (for example, credited medal). Further, on the right side of the base portion 4 is provided a medal inserting slot 7 to insert a medal that is the game value, and to the right of the opening 7 is provided a bill inserting slot 8 to insert a bill that is the game value.

In the center portion of the base portion 4 is provided a start button (game start instructing means operable by a player) 10 to rotate the above-mentioned rotating reels by pressing operation of the player and start variations of symbols (start the game) in the symbol display areas 21L, 21C and 21R.

Further, in the lower position of the front door 2, a medal payout outlet 13 and medal receiving portion 14 are installed, while to both sides of the medal payout outlet 13 are provided speakers 15L and 15R for generating sound effects of the representation and the like. Further, in the upper position of the front door 2 is provided a dividend table panel 16 for displaying combinations of wining symbols, the number of dividend medals and the like.

The above-mentioned liquid crystal display portion 2*a* is comprised of a transmissive liquid crystal display device 30 provided with protection glass, display plate, liquid crystal panel, light guide plate, reflection film, light source, flexible board that is comprised of a table carrier package (TCP) installed with ICs for driving the liquid crystal panel and that is connected to a terminal portion of the liquid crystal panel, and the like. The detailed configuration of the transmissive liquid crystal display device 30 will be described later.

A display mode of the liquid crystal panel is set at normally white, and enables symbols arranged on the rotating reels 3L, 3C and 3R to be visually recognized through the symbol display areas 21L, 21C and 21R to be able to continue the game even when such a situation occurs that the liquid crystal cannot be driven. Then, the symbols of the rotating reels 3L, 3C and 3R can be visually recognized when the liquid crystal existing in the symbol display areas 21L, 21C and 21R is not driven, while when the liquid crystal existing in the symbol display areas 21L, 21C and 21R is driven, display of representation or the like in this portion can be visually recognized.

As shown in FIGS. 3 and 4, LED lamps 29 are installed inside three rotating reels, 3L, 3C and 3R, of the rotating reel display device 3. The LED lamps 29 have a function as lighting means of areas mainly corresponding to the symbol display areas 21L, 21C and 21R among areas of lighting means of the symbols drawn on the rotating reels 3L, 3C and 3R and the liquid crystal panel.

In the inside of the rotating reels 3L, 3C and 3R, LED storage circuit boards 24 are installed on the back of symbols (total nine symbols; see FIG. 2) in three vertical lines appearing in the symbol display areas 21L, 21C and 21R when rotation of the rotating reels 3L, 3C and 3R is stopped, respectively. Each of the LED storage circuit boards 24 has three LED storage portions installed with a plurality of LED lamps 29. In the figure, total nine LED storage portions are indicated by Z1, Z2, Z3 starting from the left in the upper stage, Z4, Z5, Z6 starting from the left in the center stage, and Z7, Z8, Z9 starting from the left in the lower stage. The LED lamps 29 provided in the storage portions illuminate with white light the rear sides of the reel sheets with the symbols drawn thereon attached along the circumferential surfaces of the rotating reels 3L, 3C and 3R. The reel sheets have translucency, and the light output from the LED lamps 29 is transmitted to the front side.

As shown in FIG. 4, each of the rotating reels (the rotating reel 3L on the left side is only shown) is comprised of a cylindrical frame structure formed by coupling two circular frames 25 and 26 of the same shape spaced a predetermined distance (reel width) with a plurality of coupling members 27, and a conveying member 28 for conveying the driving force of a stepping motor 53L provided in the center portion of the frame structure to the circular frames 25 and 26.

Further, the LED storage circuit board 24 disposed on the inner side of each rotating reel is provided with three LED storage portions, Z1, Z4 and Z7, each storing a plurality of LED lamps 29. The LED storage circuit board 24 is installed so that the LED storage portions Z1, Z4 and Z7 are positioned on the back sides of respective symbols (total three symbols) that the player can visually recognize through the symbol display area 21L. In addition, the rotating reels 3C and 3R are not shown in the figure, but have the same configuration as that of the rotating reel 3L, and the LED storage circuit board 24 is provided inside each of the reels.

Figure 5:
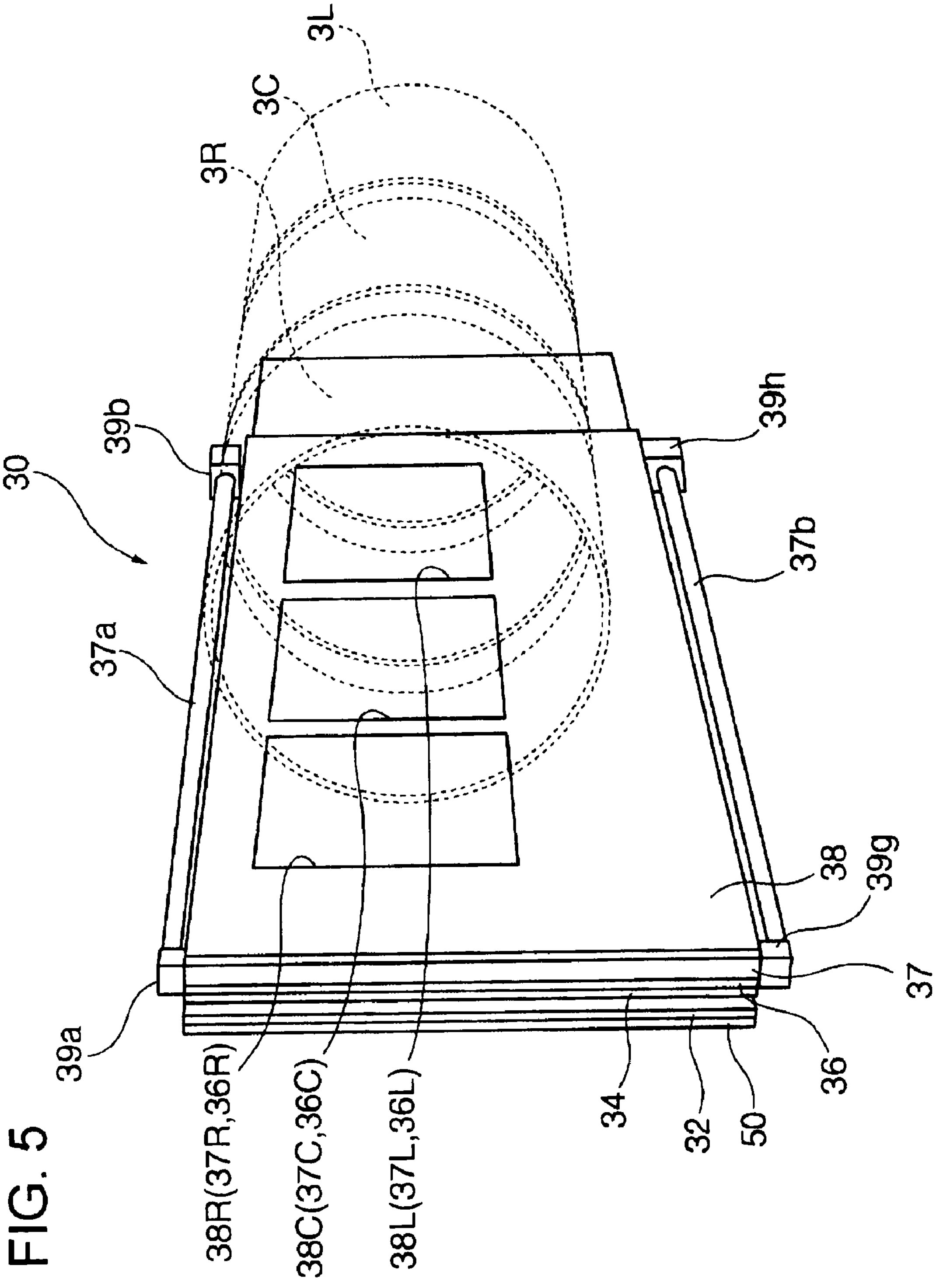
FIG. 5 is a schematic perspective view of a liquid crystal display device viewed from the inner side of the housing.
Figure 6:
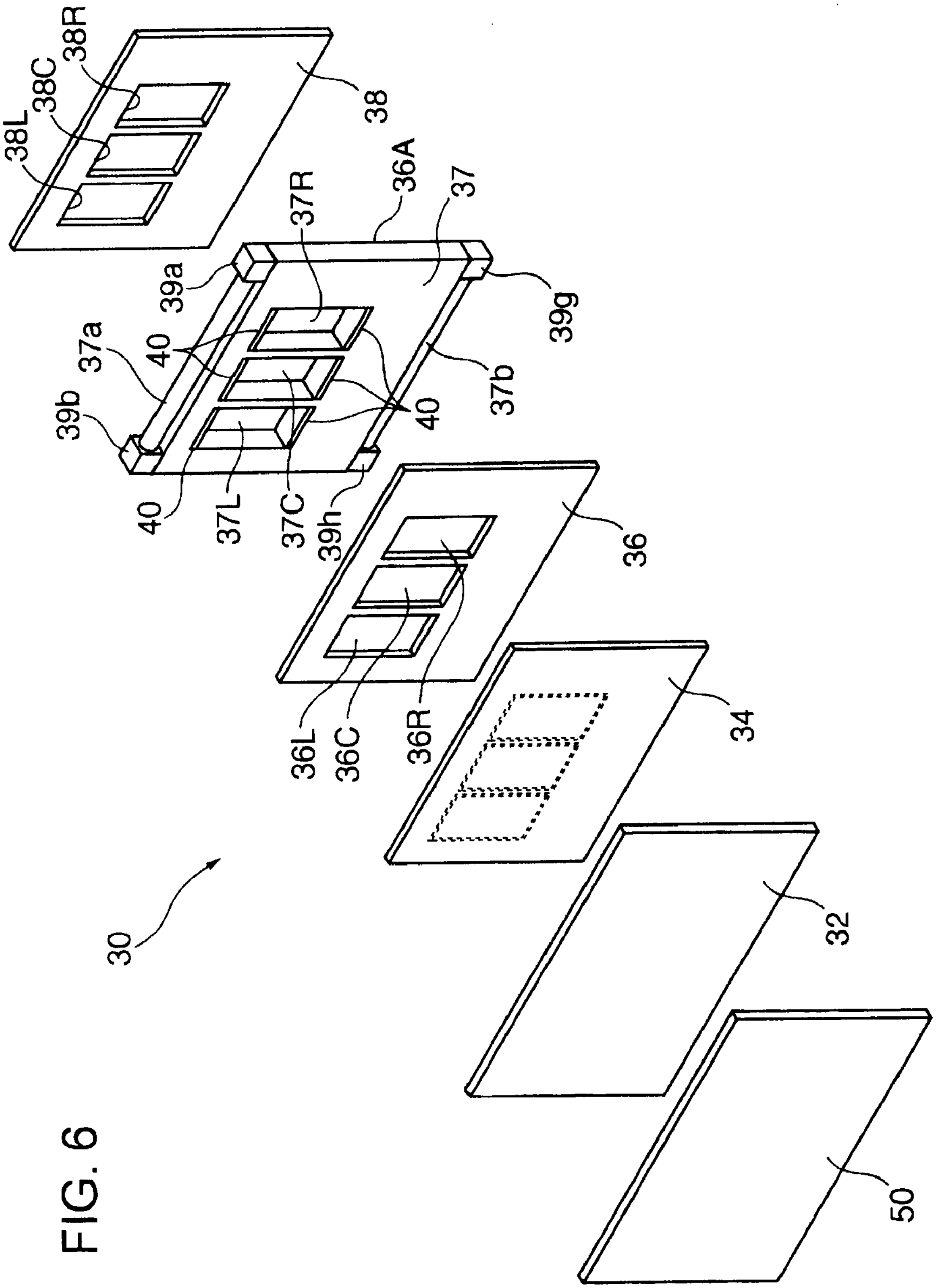
FIG. 6 is a development view of a configuration of part of the liquid crystal display device.

A configuration of the transmissive liquid crystal display device 30 constituting the liquid crystal display portion 2*a* will be described below with reference to FIGS. 5 and 6. In addition, FIG. 5 is a schematic perspective view of the liquid crystal display device 30 viewed from the inner side of the housing, and FIG. 6 is a development view of the configuration of part of the liquid crystal display device 30.

The liquid crystal display device 30 is installed forward of the display areas of the rotating reels 3L, 3C and 3R spaced a predetermined distance, and provided with a polarizing film 32, liquid crystal panel 34, diffusing sheet 36, light guide plate 37, reflector 38, fluorescent lamps (individual lighting means) 37*a* and 37*b* that are so-called white light sources (including light of all wavelengths with rates such that specific colors are not distinguished by human eye), lamp holders 39*a* to 39*d*, flexible board (not shown) that is comprised of a table carrier package (TCP) installed with ICs for driving the liquid crystal panel and that is connected to the terminal portion of the liquid crystal panel 34, and the like. In addition, to the surface of the polarizing film 32 is attached a touch panel 50 that is pressed and operated based on the content of display of the liquid crystal panel 34 and status of the game (protection glass may be attached instead of the touch panel.)

The liquid crystal panel 34 is formed by sealing liquid crystal in between the transparent board such as a glass board or the like on which a thin-film transistor is formed and another transparent board opposite to each other. In the panel 34, to the front side is attached the polarizing film 32 to generate light (linear polarization) in the vibration direction of liquid crystal molecules of the liquid crystal panel, and to the back side is attached the diffusing sheet 36 to diffuse the light from the light guide plate 37 to apply the light uniformly to the liquid crystal panel 34. The display mode of the liquid crystal panel 34 is set at normally white. Herein, the normally white is a configuration to make white display (the light goes to the display surface side, i.e. the transmitted light is visually recognized from the outside) when the liquid crystal is not driven. By adopting the liquid crystal panel 34 configured to be normally white, even when the situation occurs that the liquid crystal cannot be driven, it is possible to visually recognize symbols drawn on the rotating reels 3L, 3C and 3R through the symbol display areas 21L, 21C and 21R, and to continue the game. In other words, even when such a situation occurs, it is made possible to play the game based on the variable display manner and stop display manner of the rotating reels 3L, 3C and 3R.

The light guide plate 37 is provided on the back of the liquid crystal panel 34 to guide the light from the fluorescent lamps 37*a* and 37*b* to the liquid crystal panel 34 (to light the liquid crystal panel), and for example, is formed of a translucent member (having the light guide function) such as an acrylic resin and the like with the thickness of about 2 cm.

Used as the reflector 38 is, for example, a plate such that a silver deposition film is formed on a white polyester film or aluminum thin film, and the reflector 38 reflects the light introduced to the light guide plate 37 toward the front side of the light guide plate 37.

In the diffusing sheet 36, light guide plate 37 and reflector 38, transmissive areas (36L, 36C and 36R), (37L, 37C and 37R) and (38L, 38C and 38R) are formed in relation to installation positions of the rotating reels 3L and 3C and 3R, respectively. The size and position of each of the transmissive areas is formed to agree with the symbol display area 21L, 21C or 21R as shown in FIG. 2, and the light introduced to the light guide plate 37 is reflected in areas except the transmissive areas to function as the lighting means of the window frame display areas 22L, 22C and 22R of the liquid crystal panel 34 and representation display area 23. According to this configuration, the player is capable of visually recognizing the variable display and stop display of each of the rotating reels through the transmissive area, and therefore, enjoying the game according to the display manner of the rotating reels in the symbol display areas 21L, 21C and 21R and the display manner of the liquid crystal display portion 2*a*.

The fluorescent lamps 37*a* and 37*b* are disposed along the upper end portion and lower end portion of the light guide plate 37, and opposite ends of the lamps are supported by lamp holders 39*a* and 39*b* and lamp holders 39*g* and 39*h*. The fluorescent lamps 37*a* and 37*b* introduce the light to the light guide plate 37, and function as the lighting means of areas mainly corresponding to the window frame display areas 22L, 22C and 22R and the representation display area 23 among areas of the liquid crystal panel 34.

Further, the light guide plate 37 is provided with the deflecting members in the frame portions constituting the display windows 37L, 37C and 37R. The deflecting members deflect the introduced light from the fluorescent lamps 37*a* and 37*b* which is introduced to within the light guide plate 37 toward the surfaces of the rotating reels. Each of the deflecting members is to use the introduced light from the fluorescent lamps 37*a* and 37*b* to irradiate the rotating reels, as well as using as backlight of the liquid crystal panel, and to be installed to the frame portion of the display window with ease, for example, can be configured by a prism sheet (see FIG. 7) formed in the shape of a sheet.

Figure 7:
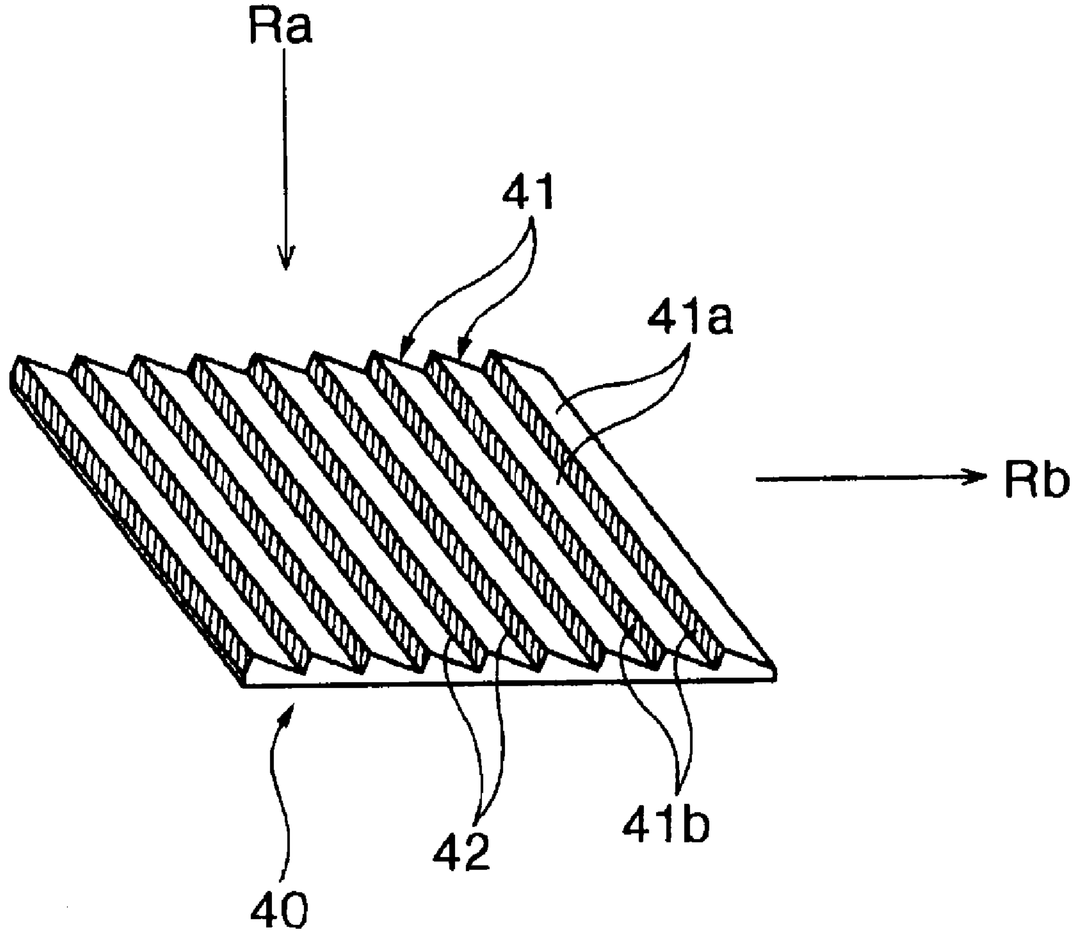
FIG. 7 is a view showing a schematic configuration of a prism sheet.

As shown in FIG. 7, the prism sheet 40 has, for example, a configuration such that a plurality of prisms 41 of substantially triangular cross section is periodically arranged in a sheet made of resin that is a base material, and is configured to reflect the light incident upon inclined surfaces 41*a* of the prisms 41 periodically arranged by the surfaces to deflect. Such a prism sheet 40 can be formed integrally with a sheet material formed of a resin material such as PET, polycarbonate, acrylic resin and the like, and it is preferable to coat each vertical surface 41*b* constituting the periodical prism 41 with a shading material 42 not to cause the introduced light to scatter (in the figure, the shading material is shown by oblique lines.)

Figure 8:
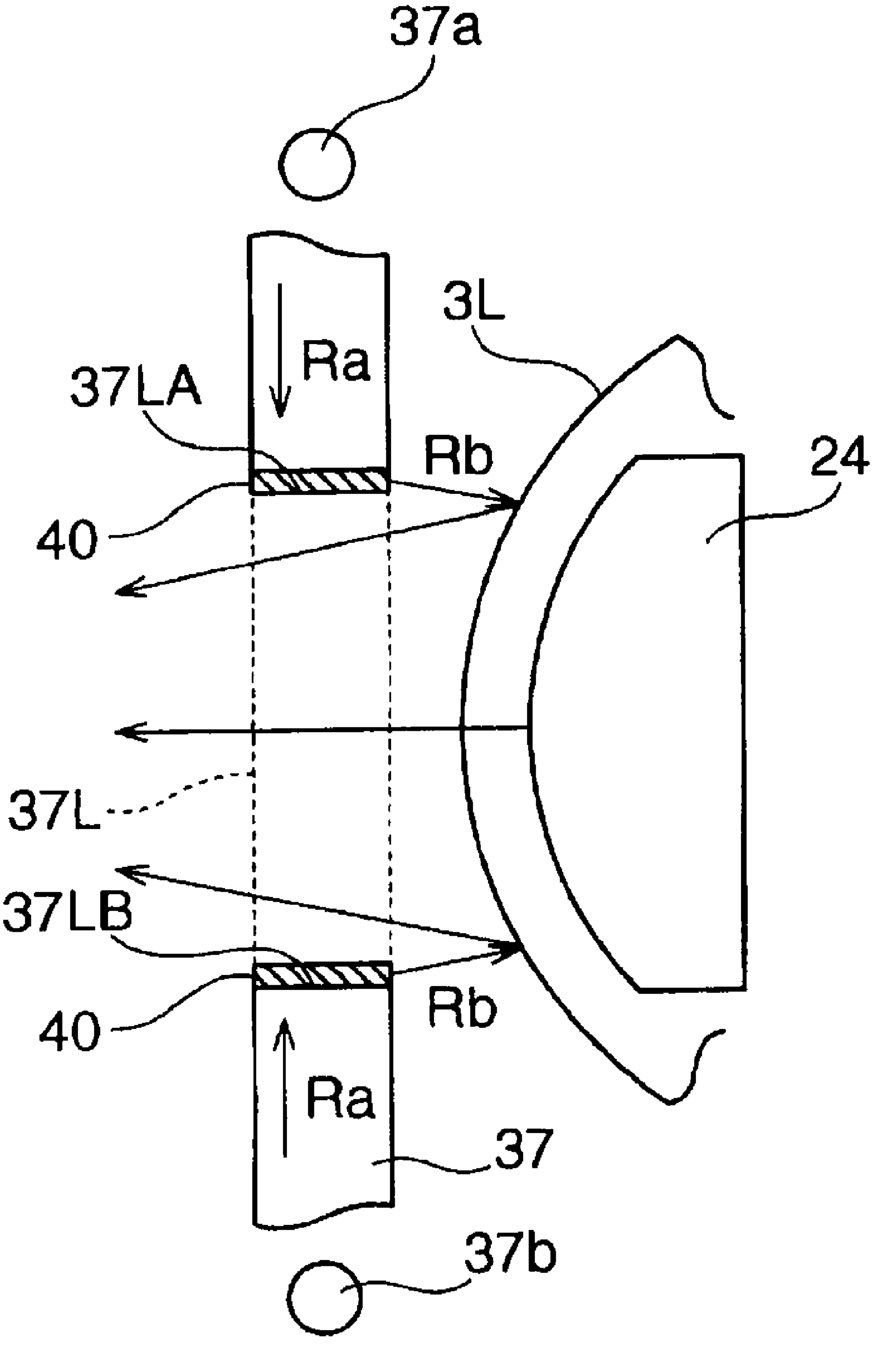
FIG. 8 is a schematic view showing a state where light introduced to a light guide plate is deflected toward a vertex area of the rotating reel.

An installation state of the prism sheet 40 with respect to the frame portion is set so that, as shown in FIG. 8, the introduced light Ra introduced to the light guide plate 37 is deflected (deflected light Rb) toward the vertex area side of the rotating reel 3L by the periodically formed prisms 41 as described above. In other words, the prism sheet 40 is attached to each of the upper and lower frames 37LA and 37LB of positions to which the introduced light is propagated within the frame portion constituting the display window 37L. In this case, as shown in the figure, in the rotating reel 3L, the display window side is curved, the upper and lower positions thereof (upper and lower symbols in the symbol line as shown in FIG. 2) tend to be dark, and therefore, such a setting is preferable that the deflected light Rb is applied particularly to the upper and lower symbol areas with respect to the center symbol position. In addition, the figure shows only the portion of the display window 37L and rotating reel 3L, but the same configuration is adopted to the display windows 37C and 37R and rotating reels 3C and 3R.

According to the slot machine with the aforementioned configuration, during the game, the player visually recognizes symbol information of the rotating reels through the display windows 37L, 37C and 37R (symbol display areas 21L, 21C and 21R) formed in the light guide plate 37 with the symbol information superimposed on the image information displayed in the transmissive liquid crystal display device 30. In this case, by using the prism sheets 40 installed in the frame portion of each of the display windows, the upper and lower symbol positions are irradiated which are the curved portions of the rotating reel, and it is made easier for the player to see the symbol information visually recognized through the window frame.

As a matter of course, in the above-mentioned configuration, fluorescent lamps that apply the light to the rotating reels 3L, 3C and 3R may be disposed in the upper position and lower position on the back side of the reflector 38. In other words, by providing such fluorescent lamps, the surface areas of the rotating reels 3L, 3C and 3R are irradiated more brightly, and it is made easier for the player to visually recognize the symbol information of the rotating reels, while the reflected light from the reels lights the liquid crystal panel 34. Accordingly, such fluorescent lamps can be made function as the lighting means of areas mainly corresponding to the symbol display areas 21L, 21C and 21R among areas of the liquid crystal panel 34, in addition to the lighting means of the symbols arranged on the rotating reels 3L, 3C and 3R.

Thus, according to the gaming machine with the above-mentioned configuration, during the game, players are able to visually recognize the identification information of the variable display device superimposed on the image information displayed in the transmissive image display device. In this case, the identification information is visually recognized through the display device formed in the light guide plate, and since the frame portion of the display device is provided with the deflecting member that deflects the introduced light toward the identification information display portion of the variable display device, the players become easier to visually recognize the identification information through the display window. Further, the identification information is visually recognized through the display window, and therefore, by providing the frame portion of the display window with the deflecting member, it is possible to efficiently irradiate the identification information.

Further, according to the gaming machine with the above-mentioned configuration, the variable display device is provided with a rotating reel with the identification information described on its outer circumference, and the deflecting member is installed to apply the introduced light toward the vertex area of the rotating reel.

Accordingly, the vertex area of the rotating reel constituting the variable display device is usually a pay line, and by irradiating the vertex area by the deflecting member, the player becomes easier to grasp a result of the game.

The embodiment of the invention is described in the foregoing, but the invention is not limited to the aforementioned embodiment, and is capable of being modified in various manners.

In the above-mentioned embodiment, the prism sheet is used as the deflecting member, but various kinds of members can be used which have the function of deflecting the light introduced to the light guide plate 37 to the vertex area of the rotating reel. For example, a reflecting sheet may be used which has a coating such as silver or the like having the reflecting property.

Further, in the above-mentioned embodiment, the variable display device is configured as a rotating reel device that mechanically rotates, but is not limited to such a device that mechanically rotates to be visually recognized. For example, the variable display device may be configured using a device such as, for example, CRT, LCD, plasma display, organic EL display, liquid crystal projector and the like which displays images associated with the game.

Furthermore, the invention is applicable to various kinds of gaming machines such as a pachinko gaming machine, arrange ball, mah-jongg gaming machine, video slot, video poker and the like, as well as the above-mentioned slot machine.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A gaming machine comprising:

a variable display device that variably displays a plurality of kinds of identification information required for a game; and a transmissive image display device that enables the identification information of the variable display device to be visually recognized, wherein:

the transmissive image display device includes a display panel that displays an image, and a light guide plate that is provided on the back side of the display panel and that irradiates the display panel and includes a display window disposed therein to cause the identification information of the variable display device to be visually recognized;

a deflecting member, which deflects introduced light introduced to inside the light guide plate toward a display portion of the identification information of the variable display device, is provided in a frame portion of the display window;

the deflecting member includes a prism sheet with the shape of a sheet, the prism sheet includes a plurality of prisms of substantially triangular cross section, the prisms are periodically arranged in a sheet that is a base material, and each prism includes a respective vertical face;

each of said vertical faces is coated with a shading material that does not cause the introduced light to scatter;

the prism sheet is attached to each of upper and lower frame position to which the introduced light is propagated within the frame portion constituting the display window; and the prism sheet is configured to reflect and deflect the light incident upon inclined surfaces of the prisms periodically arranged on the surface of the prism sheet to upper and lower symbol areas of the variable display device.

2. The gaming machine according to claim 1, wherein the variable display device is provided with a rotating reel with the identification information described on its outer circumference, and the deflecting member is installed to apply the introduced light toward a vertex area of the rotating reel.

3. The gaming machine according to claim 1, wherein the prism sheet is formed integrally with a sheet material formed of a resin material selected from group consisting of PET, polycarbonate, acrylic resin.

4. The gaming machine according to claim 1, wherein the gaming machine is a slot machine.

5. The gaming machine according to claim 1, further including at least one fluorescent light facing a perimeter of the light guide plate.

6. The gaming machine according to claim 5, wherein the at least one fluorescent light is mounted on the light guide plate.

7. The gaming machine according to claim 1, wherein each prism sheet is adjacent to at least one surface of the frame portion directly exposed to an interior of the window.

* * * * *